(12) United States Patent
Warrior et al.

(10) Patent No.: US 7,890,301 B2
(45) Date of Patent: Feb. 15, 2011

(54) METHOD FOR CLUSTER HEAD SELECTION IN NETWORKS ACCESSED BY MOBILE DEVICES

(75) Inventors: Jogesh Warrior, Mountain View, CA (US); John C. Eidson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1094 days.

(21) Appl. No.: 10/876,048

(22) Filed: Jun. 24, 2004

(65) Prior Publication Data

US 2005/0288904 A1 Dec. 29, 2005

(51) Int. Cl.
*G06F 15/00* (2006.01)

(52) U.S. Cl. ............... 702/188; 702/122; 702/181; 455/436; 455/510; 455/525

(58) Field of Classification Search ............... 702/122, 702/188; 455/525, 452.1, 445, 510, 436–444; 370/252, 443, 328; 340/539.22
See application file for complete search history.

(56) References Cited

U.S. PATENT DOCUMENTS

| | | | | |
|---|---|---|---|---|
| 6,055,277 | A * | 4/2000 | Stephens et al. | 375/285 |
| 6,430,414 | B1 * | 8/2002 | Sorokine et al. | 455/442 |
| 6,711,408 | B1 * | 3/2004 | Raith | 455/440 |
| 7,242,294 | B2 * | 7/2007 | Warrior et al. | 340/539.22 |
| 2002/0045453 | A1 * | 4/2002 | Juttner et al. | 455/445 |
| 2003/0012143 | A1 * | 1/2003 | Chen et al. | 370/252 |
| 2004/0081166 | A1 * | 4/2004 | Stanforth et al. | 370/395.32 |
| 2005/0057370 | A1 | 3/2005 | Warrior et al. | |
| 2005/0085231 | A1 * | 4/2005 | Dillinger et al. | 455/445 |
| 2005/0122999 | A1 * | 6/2005 | Scherzer et al. | 370/480 |

FOREIGN PATENT DOCUMENTS

EP 1 189 468 3/2002

OTHER PUBLICATIONS

U.S. Appl. No. 10/664,400, Jogesh Warrior et al.
European Search Report dated Sep. 29, 2005; 2 pages.
Stephanie Lindsey et al—"PEGASIS: Power-Efficient Gathering in Sensor Information Systems"; Aerospace Conference Proceedings, 2002, IEEE Mar. 9-16, 2002, Piscataway, NJ, USA; vol. 3, Mar. 9, 2002; pp. 1125-1130.
Peter Sholander et al—"Energy-Efficient Networking Techniques for Wireless Sensor Networks"; 2003 IEEE Military Communications Conference; Milcom 2003, Boston, MA; Oct. 13-16, 2003; IEEE Military Communications Conference, New York, NY; Oct. 13, 2003; pp. 573-578.
A. Wadaa et al—"On Training a Sensor Network"; Proceedings of the International Parallel and Distributed Processing Symposium; Apr. 22-26, 2003, Piscataway, NJ; pp. 220-227.

* cited by examiner

*Primary Examiner*—Drew A Dunn
*Assistant Examiner*—Hien X Vo

(57) ABSTRACT

Representative embodiments are directed to distributed sensor systems from which measurement data is extracted using mobile devices. Representative embodiments record access attempts by the mobile devices and calculate the probabilities of future access by a mobile device to sensor devices using the recorded information. Collection points are selected in response to the probabilities of future access. Additionally, memory management and data prioritization may occur that is at least partially dependent upon the probabilities of future access.

31 Claims, 3 Drawing Sheets

METHOD FOR CLUSTER HEAD SELECTION IN NETWORKS ACCESSED BY MOBILE DEVICES

TECHNICAL FIELD

The present invention is generally related to distributed sensor systems.

BACKGROUND

As advances in microelectronics, microsensors, and wireless communications have occurred, new types of distributed measurement systems have been proposed and, in some cases, implemented. It is possible to implement such measurement systems by appropriately implementing the measurement functionality and communication functionality of the sensor devices. In general, the sensor-devices are designed to operate over extended periods using battery power and/or passively generated power (e.g., photo-voltaic resources). Also, the sensor devices generally are designed within relative minimal complexity (e.g., limited computational, memory and communication resources). Also, the sensor devices of these systems communicate using short-range wireless methods. For example, ad hoc wireless networks (e.g., IEEE 802.11b networks, Bluetooth networks, and/or the like) may be formed by the sensor devices to facilitate the transfer of measurement data. The organization of sensor-devices using short-range wireless communication protocols are referred to as scatter nets, ad hoc sensor nets, pico nets, and/or the like.

FIG. 1 depicts a typical distributed sensor system 100 that employs a plurality of sensor devices 102. Sensor system 100 could be used to gather measurements for any number of applications. For example, sensor system 100 could be used to obtain chemical measurements across a city to facilitate environmental monitoring of the city. Depending on the intended purpose of sensor system 100, the number of sensor devices 102 within the system may range from a handful of sensor devices 102 to thousands or more. Using higher-powered radio communications with access points 103, collection point devices 101 enable the measurement data to be forwarded to application server 105 through network 104. Application server 105 processes the data according to higher-level algorithms as appropriate for the intended purpose of sensor system 100.

Within distributed sensor system 100, sensor devices 102 are organized in respective scatter nets (shown as nets 106-1 and 106-2). As shown in FIG. 1, sensors 102-1, 102-2, and 102-3 communicate with collection point device 101-1 thereby forming net 106-1. Likewise, sensors 102-4, 102-5, and 102-6 communicate with collection point device 101-2 thereby forming net 106-2. Within their respective net 106, sensors 102 utilize low-energy short-range radio communication to forward the processed measurement data to a respective collection point device 101.

The communication between an individual sensor 102 and a respective collection point device 101 need not be direct. For example, sensor 102-3 may forward measurement data to sensor 102-2 which will then forward the data to collection point device 101-1. When a relatively large number of sensor devices 102 are employed within a respective scatter net, the number of communications "hops" to collection point device 101 can be significant. The number of communications hops is related to the amount of energy required to reach the collection point. Accordingly, the selection of nodes to perform collection point services affects the total amount of energy expended by the sensor net.

A number of protocols exist that attempt to minimize the amount of energy expended by the sensor net by judiciously selecting nodes to perform collection point services. Two such protocols are the LEACH protocol and the PEGASIS protocol. These protocols are based on a number of assumptions. First, these protocols assume that conservation of power is a dominant issue since the sensor devices are battery powered and intended to be deployed in the field for a relatively long time. Also, these protocols assume that all of the sensor samples are important and must be delivered to access points. The protocols assume that access to the external world is fixed through static access points 103. Furthermore, the protocols also assume that the communication with access points 103 occurs according to defined periods.

As a result of these assumptions, nodes are selected to perform collection point services at random. Data is then routed from individual sensors to the nearest respective collection point node 101. Data is aggregated in transit to the collection point nodes 101 when possible. Non-collection point nodes operate at power levels that are only sufficient to reach the "next" node in route to a collection point node. Collection point nodes 101 operate at considerably higher power to transmit over the longer distance to an access point 103. Because collection point nodes 101 consume more power than other nodes, the selection of collection point nodes 101 occurs repetitively to average the energy dissipation patterns over the entire sensor net. Additionally, the transmission of data from sensors 102 to collection points 101 and from collection points 101 to access points 103 are carefully planned to enable nodes to operate in a low power sleep mode most of the time.

SUMMARY

Representative embodiments are generally directed to distributed sensor systems that forward measurement data using mobile devices as access point devices. For example, a cellular phone or other wireless device may perform the access point services. As the mobile device travels through a distributed sensor system, the mobile device transmits a signal indicating that the mobile device is attempting to access measurement data. Nodes in the respective scatter nets of the distributed sensor system respond to the signal by establishing wireless communication with the mobile device and thereafter communicating the measurement data. The mobile device may then utilize another network (e.g., a cellular network) to forward the collected data to one or several application servers.

Because the communication of measurement data to application servers occurs through mobile devices, the spatial characteristics associated with communication with the mobile devices are not statically defined. Additionally, the timing of the access attempts cannot be deterministically known. Representative embodiments determine the probabilistic characteristics between mobile devices and nodes of the scatter nets during the operation of a distributed sensor system. Specifically, certain nodes will be identified as possessing greater probability of future access upon the basis of detected access attempts.

Upon the basis of the probabilistic characteristics, collection points are selected. If the probability of future access within a portion of the sensor net is relatively high, the selection of collection points may cause the density of collection points within that portion to be relatively low. Likewise, if the probability of future access with a portion of the sensor net is relatively low, the selection of collection points may cause the density of collection points within that portion to be relatively high. Because the selection of the collection points occurs according to the probabilistic characteristics of access attempts, energy expended by communication of measurement data to application servers may be reduced. Specifically, the communication between a collection point and a mobile device may utilize a low energy transmission that is comparable to the internode communication energy.

The probabilistic characteristics of mobile device interaction with nodes of a sensor net may impact other operations of a sensor net. For example, measurement data may be prioritized for communication from collection points to mobile devices to ensure delivery to an application server in a timely basis. Additionally or alternatively, the management of measurement data in the memory of a sensor device may be managed according to the probabilistic characteristics. Measurement samples of lesser importance may be replaced by statistical data to free memory resources if appropriate for a particular application.

DETAILED DESCRIPTION

Representative embodiments employ mobile devices to perform access point services for a distributed sensor system. In one representative embodiment, cellular phones communicate with sensor devices in scatter nets to obtain measurement data and communicate that data to application servers using the cellular network infrastructure. Although one embodiment employs cellular phones to perform access point services, the present invention is not so limited. Representative embodiments may employ personal digital assistants (PDAs), laptop computers, other consumer electronic devices, commercial/industrial devices (e.g., fork lifts), vehicles, or any other mobile devices to which suitable communication resources can be integrated or attached. Further details regarding accessing sensors of a distributed sensor system using mobile devices may be obtained in U.S. patent application Ser. No. 10/664,400, entitled "The Method and Use of Pervasive Mobile Infrastructure to Access Individual or Networked Sensors, Actuators, or Other Devices," which is incorporated herein by reference.

Figure 1:
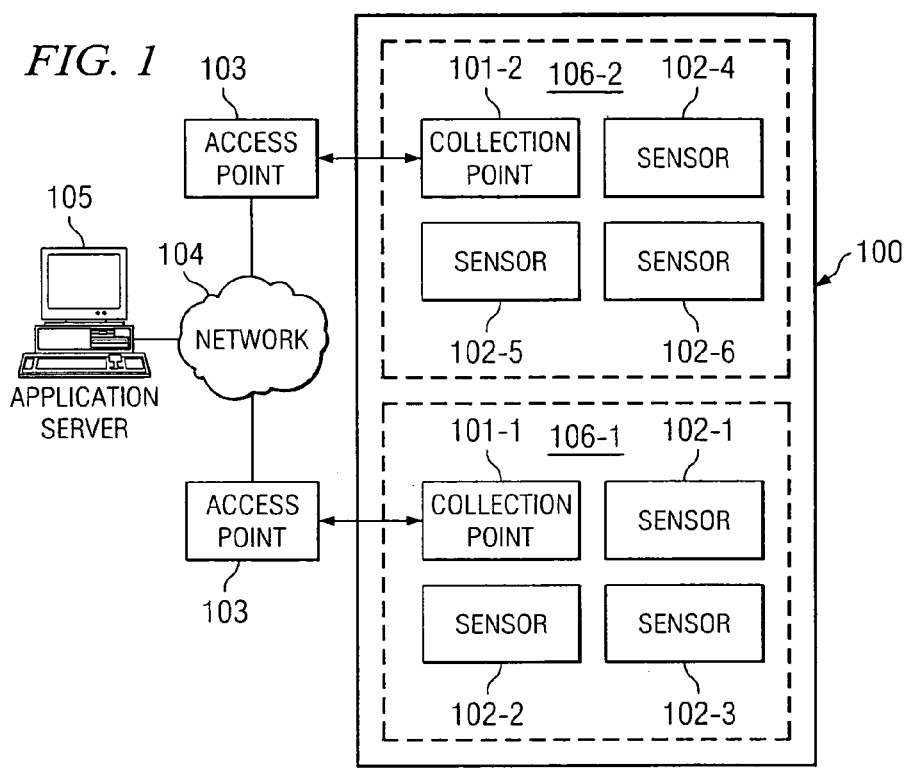
FIG. 1 depicts a typical sensor net system.
Figure 2:
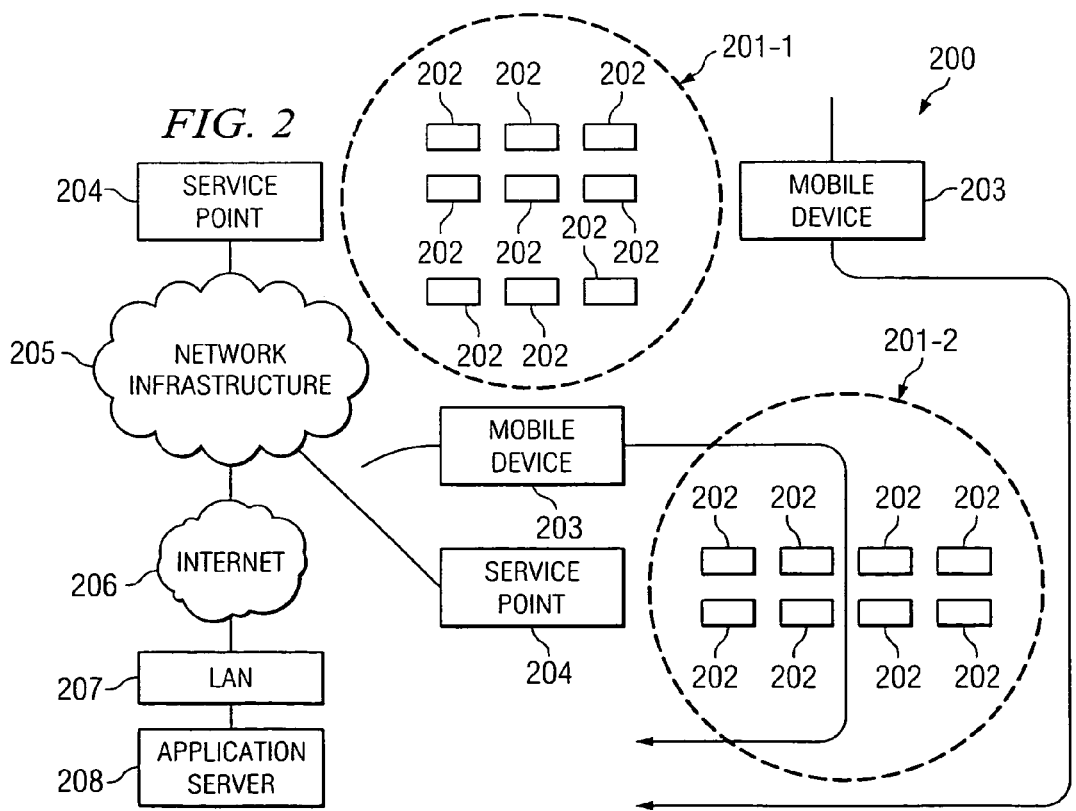
FIG. 2 depicts a sensor net system according to one representative embodiment.

FIG. 2 depicts system 200 in which mobile devices obtain measurement data from scatter nets according to one representative embodiment. As shown in FIG. 2, scatter nets 201-1 and 201-2 include a plurality of sensor devices 202. Sensor devices 202 obtain measurement data upon command, according to a time schedule, and/or by any other suitable scheme. Sensor devices 202 include short-range radio communication capabilities that enable sensor devices 202 to organize themselves into scatter nets 201. Sensor devices 202 may periodically enter a sleep mode to conserve energy. In the sleep mode, a small amount of resources are maintained and, hence, relatively little energy is expended. When sensor devices 202 are not in the sleep mode, sensor devices 202 obtain measurement samples, process the samples as appropriate, aggregate data for communication, conduct net management activities, and/or the like.

Some or all sensor devices 202 include communication resources to communicate with mobile devices 203 (e.g., cellular phones). From time to time, mobile devices 203 may be brought within communication range of portions of scatter nets 201-1 and 201-2. Mobile devices 203 broadcast a suitable signal that indicates that mobile devices 203 are attempting to obtain measurement data. In one representative embodiment, the suitable signal may be a signal defined by a typical wireless communication protocol (e.g., IEEE 802.11b or Bluetooth protocols) to begin wireless communications. As previously noted, sensor devices 202 may be placed into a low power "sleep mode" for periods of time. Because the presence of a mobile device 203 within communication range is a random occurrence, an initial signal from a mobile device 203 may cause sensor devices 202 to leave the sleep mode. A subsequent signal may then be used to initiate wireless communications according to typical protocols.

For example, each sensor device 202 may include a discrete very low power receiver to generate a "wake-up" signal. When a suitable signal is received via the low power receiver, power may be provided to the processing resources, communication resources, and other resources of a sensor device 202 to enable communication with the respective mobile device 203. Alternatively, a passive radio frequency (RF) circuit may be employed to initiate power-on activities. For example, an antenna could be appropriately coupled to bias a Schottky diode. The coupling may employ tuned or broadband detection to activate a field effect transistor (FET) to cause the sensor device 202 to exit the sleep mode. Similarly, a resonant acoustical structure (e.g., a MEMs device) could be employed to provide inductive or capacitive coupling in response to an ultrasound signal to initiate power-on activities.

The use of a signal to sensor devices 202 to cause sensor devices 202 to leave the sleep mode may depend upon the rate of movement of mobile devices 203 and the duration of the sleep mode period. For example, if a mobile device 203 is moving relatively slowly relative to the sleep mode period, the mobile device 203 may rely upon typical wireless communications to begin communications with sensor devices 202. Specifically, because the sleep mode period is known, it may be determined that sensor devices 202 will eventually leave the sleep mode while the mobile device 203 is within communication range. Alternatively, if mobile device 203 moves more quickly, a mobile device 203 may rely upon the wake-up signal to initiate communications while the mobile device 203 is still within communication range.

Each sensor device 202 that is capable of communicating with mobile devices 203 and that receives an access attempt signal from a mobile device 203 updates a suitable log to enable the future probability of access to be determined. The log may include an entry for each access attempt over a suitable time window. Also, the entries in the log may be time-stamped to enable the probability of access to be correlated to temporal information. Additional information needed for particular forms of the probability and cost function calculations may also be entered into the log (for example, received signal strength, battery levels, available memory capacity, and/or the like). The maintenance of an access log occurs whether or not the respective sensor devices 202 are currently serving as collection points.

In addition, sensor devices 202 that are currently performing collection point services communicate stored measurement data in response to the access attempt signal. Mobile devices 203 then communicate measurement data via service points 204 to application server 208 using a suitable communication mechanism (e.g., cellular services). For example, mobile devices 203 may use a data packet communication protocol to communicate the data to service points 204 (e.g., base stations of a cellular network). The data may be communicated through network infrastructure 205 (e.g., a cellular infrastructure) and Internet 206 to local area network (LAN) 207. One or several application servers 208 connected via LAN 207 may store and process the measurement data.

From time to time, sensor devices 202 that are capable of communicating with mobile devices 203 examine their respective logs of access attempts. Each of these sensor devices 202 calculates the probability of future access by a mobile device 203 using the recorded information. In other embodiments, knowledge regarding future probabilities of access may be maintained by devices other than sensor devices 202. For example, by analysis of cellular or other activity patterns, it may be determined that the probabilities for various sensor devices 202 may be relatively high for certain times of the day. Mobile devices 203 may be used to communicate future access probabilities to sensor devices for the collection point selection and other algorithms.

In response to the distribution of future access probabilities, sensor devices 202 are selected to perform collection point services. If the spatial distribution of probabilities is relatively uniform and high, no collection points may be selected and mobile devices 203 may obtain measurement data directly from the originating sensor devices 202. As the probabilities of future access within a sensor net decreases, collection points may be selected for routing of data from a cluster of sensor devices 202. The routing of data to collection points may depend upon the density of the collection points. For example, if the collection point density is relatively low, spanning tree algorithms may be used to route data to minimize the energy associated with the routing. Alternatively, if the collection point density is relatively high, a low complexity diffusion of measurement data may be employed.

In one embodiment, sensor devices 202 are selected to perform collection point services on a random basis. Additionally, the probabilities of future access are used to weight the random algorithm. By doing so, the density of collection point nodes within portions of a sensor net will be a function of the probabilities of future access. Specifically, when the probabilities of future access to nodes within a portion of a sensor net are relatively high, the density of collection points within that region will be relatively low. Likewise, when the probabilities of future access to nodes within a portion of a sensor net are relatively low, the density of collection points within that region will be relatively high. Other criteria could be applied for collection point selection. For example, a minimum probability of future access for a particular sensor device 202 may be imposed upon the collection point selection process.

Because the selection of the collection points occurs according to the probabilistic characteristics of access attempts, energy expended by communication of measurement data to application servers may be reduced. Specifically, the communication between a collection point and mobile device 203 may utilize a low energy transmission that is comparable to the internode communication energy. Also, because the amount of energy used for data transmission is reduced, energy resources may be allocated to other activities.

For example, representative embodiments may employ the energy made available by reducing communication costs to address memory capacity issues. In one embodiment, processing of measurement data by sensor devices 202 may be employed to address memory capacity issues. A number of processing algorithms could be employed. For example, statistical analysis could be performed by sensor devices 202. The average measurement value, the maximum measurement value, and the measurement minimum value may be recorded for respective time windows. Alternatively, details related to a specific event may be recorded (e.g., the time when a measurement sample was obtained that exceeded a threshold value). If the memory of a respective sensor device 202 becomes nearly consumed by measurement data, the sensor device 202 may delete the measurement samples and retain the processed data to free memory resources as appropriate.

The processing of measurement data by application server 208 may be implemented in a manner that accounts for the possibility that not all measurement data may be delivered. Also, because the communication between mobile devices 203 and the collection points is a random process, a variable amount of latency will most likely be experienced in the delivery of measurement data. In view of these considerations, algorithms may be employed to prioritize the delivery of measurement data according to the "importance" of the measurement data to application server 208. For example, data collected by sensor devices 202 having relatively high future access probability could be prioritized for delivery. Specifically, those sensor devices 202 are the closest devices to mobile devices 203 and, hence, closest to individuals operating the mobile devices 203. Thus, measurements made by those sensor devices 202 may have the greatest relevance for a particular application.

The prioritization algorithms may affect a number of operations of sensor devices 202. For example, the prioritization algorithms may identify data for deletion from memory when the memory capacity of a device is reached. Additionally, the prioritization algorithms may affect routing decisions. Data that would otherwise be deleted in the near future may be prioritized for routing to collection points. Furthermore, measurement data that is prioritized may be routed to multiple collection points to increase the probability of its communication to application server 208 within a timely manner.

Figure 3:
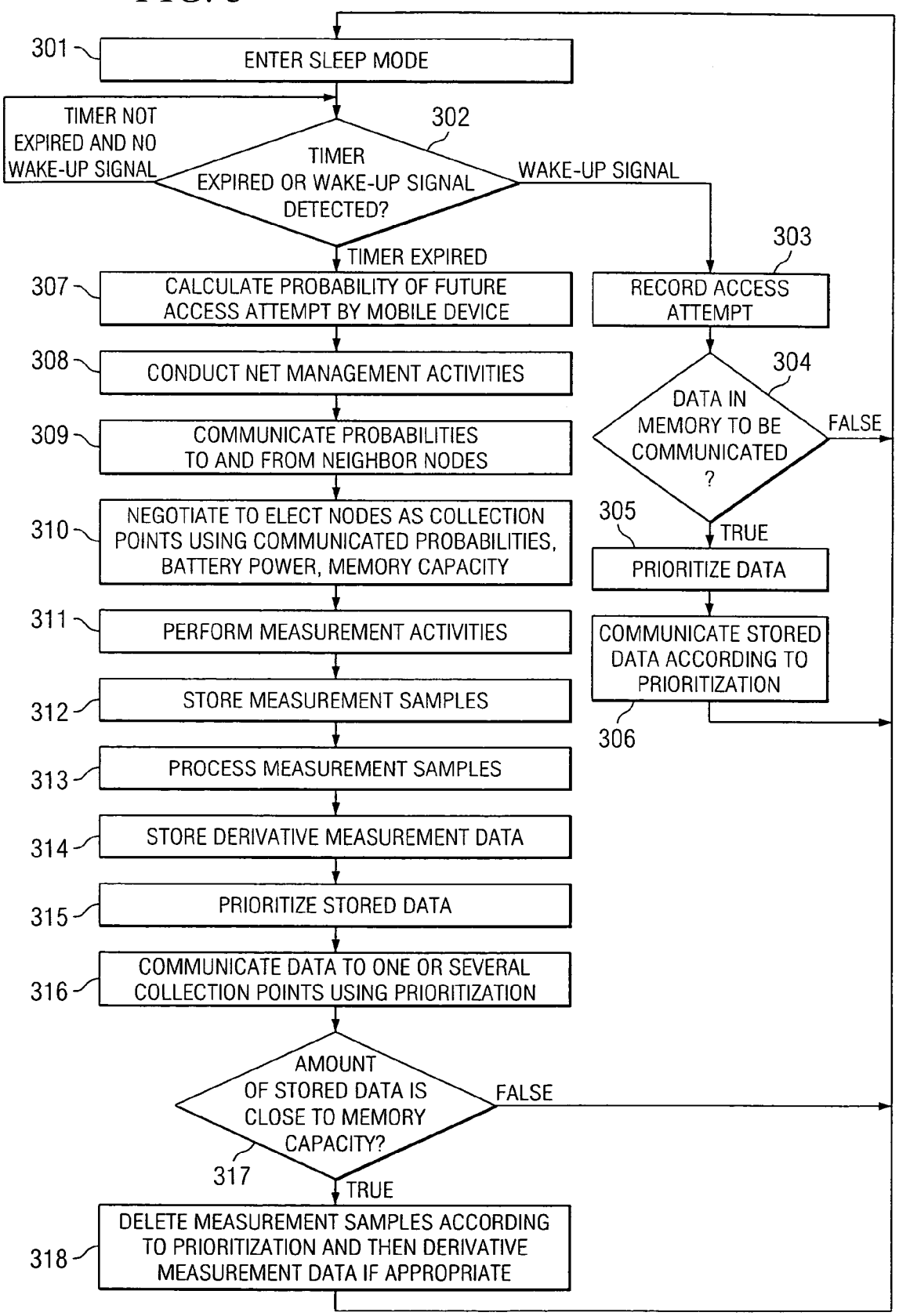
FIG. 3 depicts a flowchart according to one representative embodiment.

FIG. 3 depicts a flowchart for operating sensor device 202 within a distributed sensor system according to one representative embodiment. The flowchart of FIG. 3 could be implemented in a number of ways. For example, software instructions executed by a suitable processor could be used to control the various elements of a sensor device. Alternatively, functionality in an integrated circuit may be employed.

In step 301, sensor device 202 may enter a low power sleep mode. In step 302, a logical comparison is made to determine whether sensor device 202 should exit the sleep mode. Sensor device 202 may leave the sleep mode in response to the expiration of a timer that defines the duration of the sleep mode. Alternatively, sensor device 202 may leave the sleep mode in response to the detection of a wake-up signal.

If a wake-up signal is detected from mobile device 203, the process flow proceeds from step 302 to step 303. In step 303, the access attempt associated with the wake-up signal is recorded. In step 304, a logical comparison is made to determine whether there is data stored in memory to be communicated. If not, the process flow returns to step 301. If there is data to be communicated, the process flow proceeds from step 304 to step 305.

In step 305, data is prioritized for communication to mobile device 203. Data may be prioritized according to a number of criteria. For example, if mobile device 203 is performing collection point services, measurement data originating from identified spatial regions of a distributed sensor system may possess greater relevance for a particular application. Alternatively, different types of data may have greater relevance. Likewise, the temporal relationship between data may be used to prioritize communication of data. In step 306, the stored data is communicated according to the prioritization. The most "important" or "urgent" data is communicated first and, if mobile device 203 permits, data of lesser relevance is communicated. After the communication ceases, the process returns to step 301 to allow sensor device 202 to resume its sleep mode state.

Referring again to step 302, if the timer expired to end the sleep mode, the process flow proceeds to step 307. In step 307, sensor device 202 calculates the probability of future access by a mobile device 203. The probability of future access may be calculated using a time window average of prior access attempts. The probabilities of future access may also be a function of a time of day if appropriate for a particular application. In step 308, net management activities may occur. For example, sensor device 202 may utilize known wireless net algorithms to discover the net topology/connectivity. Additionally or alternatively, sensor device 202 may leave a given sensor net and join another sensor net as defined by net protocols.

In step 309, probabilities of future access are communicated between sensor device 202 and its neighbor devices. Specifically, the current sensor device 202 may receive probabilities of future access related to other devices. Likewise, current sensor device 202 may communicate its probability of future access to other devices. In step 301, the communicated probabilities may be used by a distributed algorithm implemented within each sensor device 202 to negotiate the "election" of nodes to perform collection point services. The distributed algorithm may employ a number of factors in addition to the probabilities of future access. The distributed algorithm may consider the battery capacity and memory capacity to select collection point nodes. Also, the selection of collection points may consider whether a data collection constraint is satisfied. For example, a determination may be made to identify whether a particular selection of collection points will possess a probability of communicating a given datum within a defined time window.

In step 311, measurement activities are performed. In step 312, the measurement samples are stored in memory. In step 313, the measurement samples are processed. For example, statistical analysis of the measurement samples may occur. Alternatively, sensor device 202 may monitor a physical phenomenon that can be represented by a suitable model. The measurement samples may be processed to calculate the parameters of the model. In another embodiment, coefficients of an approximation function may be calculated from the measurement samples. In step 314, the derivative measurement data generated by the processing is stored in memory. In step 315, the stored data is prioritized. The data may be prioritized according to the type of data, the time when the data was generated, the source of the data, and/or the like. In step 316, data may be communicated to one or several collection points using the prioritization.

In step 317, a logical comparison is made to determine whether the amount of stored data is close to the memory capacity of sensor device 202. If not, the process flow returns to step 301 where the sensor device returns to its sleep mode. If the memory capacity of sensor device 202 is almost consumed, data can be deleted according to the prioritization of the data. For example, direct measurement samples can be deleted first. Derivative measurement data can be subsequently deleted if appropriate for a particular application. Also, data may be selected for deletion depending upon the time that the data was generated, the source of the data, the type of data, and/or other suitable factors. From step 318, the process flow returns to step 301.

Each step of the flowchart shown in FIG. 3 need not be performed every time that sensor device 202 exits the sleep mode. For example, if sensor device 202 performs sampling at a relatively frequent basis, it would be appropriate to postpone net management, collection point election, measurement data processing, measurement data communication, and/or the like to conserve energy. Also, although the operations of sensor device 202 have been described in terms of a distributed algorithm, the present invention is not so limited. For example, application server 208 could receive the probabilities of future access and select collection points. The selection of collection points could be subsequently communicated to a node in the distributed sensor net by mobile devices 203. The collection point selections could then be distributed using typical net communication.

Figure 4:
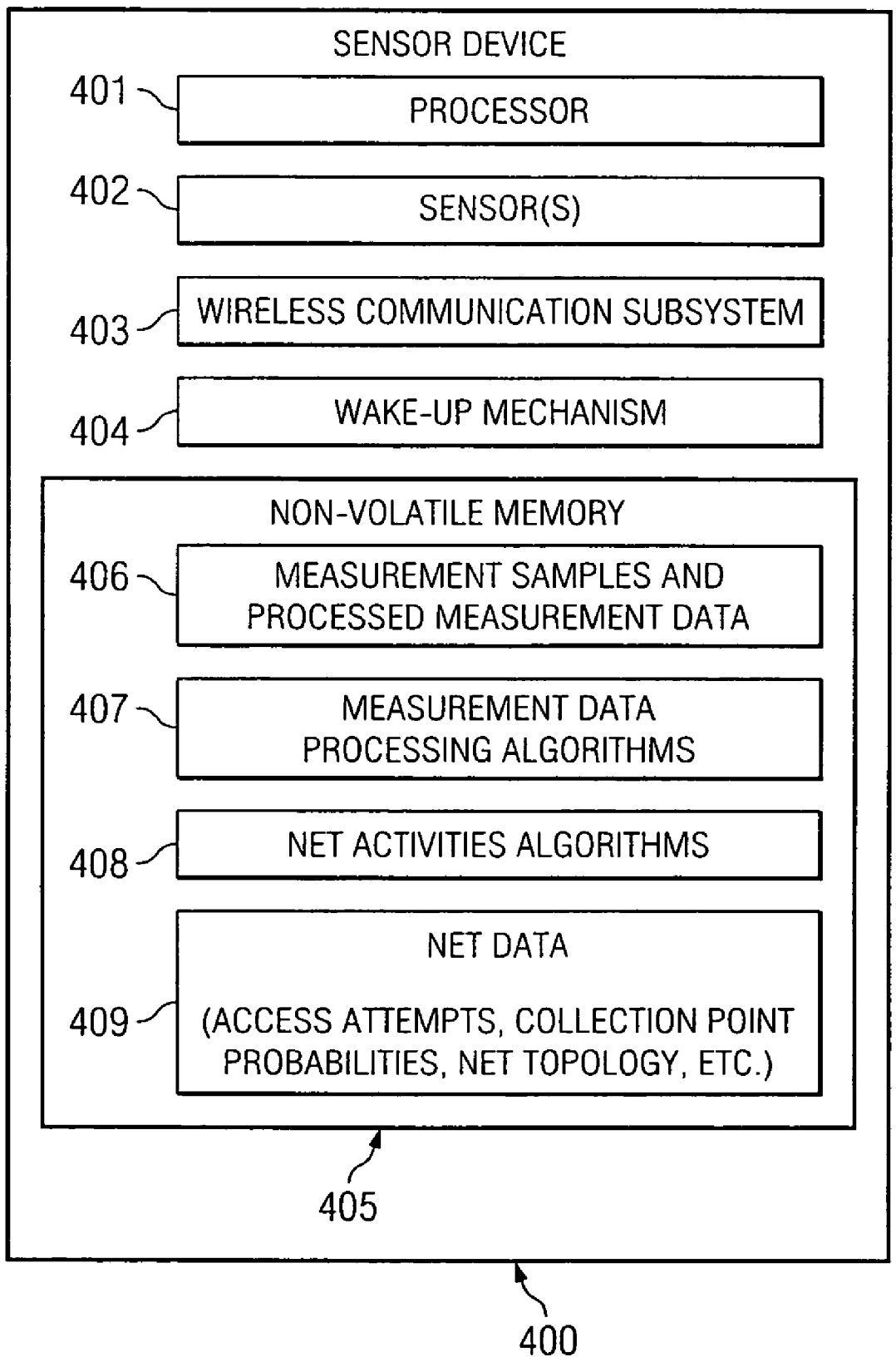
FIG. 4 depicts a sensor device according to one representative embodiment.

FIG. 4 depicts sensor device 400 according to one representative embodiment. Sensor device 400 includes processor 401, sensor(s) 402, and wireless communication subsystem 403. Sensor device 400 may further include wake-up mechanism 404 that enables a mobile device to cause sensor device 400 to leave a low power sleep mode for the communication of measurement data. Sensor device 400 further includes non-volatile memory 405. Memory 405 may be used to store measurement samples and processed measurement data 406. The processing of such data may be performed using measurement data processing algorithms 407. Specifically, executable instructions defining algorithms 407 may be retrieved from memory 405 at appropriate times to perform any type of desired processing. Memory 405 may further store executable instructions defining net activities algorithms 408. In one embodiment, net activities algorithms 408 may implement tasks 310-310 and 315-318 of FIG. 3 as an example. Non-volatile memory 405 may also store net data 209 (e.g., recorded access attempts, collection point probabilities, net topology information, and/or the like) to facilitate the execution of net activities algorithms 407. Although sensor device 400 has been shown to be implemented using executable instructions, other alternatives may be employed. For example, integrated circuit functionality may be used in lieu of or in combination with software instructions if desired.

Representative embodiments operate in a manner that differs considerably from known scatter net architectures. For example, collection points are selected according to the spatial distribution of the probabilities of future access by a mobile device. Accordingly, representative embodiments may use wireless communication power for forwarding data to an application server that is comparable to internode communication power. Moreover, representative embodiments may employ a greater amount of processing of measurement data. The processing of data may include generating statistical or model-based measurement data. The use of such derivative measurement data may reduce the memory capacity issues of sensor devices. Also, the communication requirements may be lessened.

What is claimed is:

1. A method of operating a sensor net, comprising:
   detecting access attempts by at least one mobile device to a plurality of nodes within said sensor net;
   calculating probabilities of future access attempts to said nodes within said sensor net; and
   selecting at least one node of said plurality of nodes to perform collection point services for said sensor net using said calculated probabilities of future access attempts.

2. The method of claim 1 wherein said selecting is performed by an application server remote from said sensor net.

3. The method of claim 1 wherein said selecting is performed by a distributed application implemented within nodes of said sensor net.

4. The method of claim 1 wherein said selecting comprises:
selecting a density of nodes to perform collection point services within a portion of said sensor net as a function of probabilities of future access in said portion.

5. The method of claim 1 further comprising:
communicating calculated probabilities through said sensor net.

6. The method of claim 1 wherein said probabilities of future access attempts are a function of time.

7. The method of claim 1 further comprising:
receiving wake-up signals from the at least one mobile device that cause nodes of said sensor net to leave a sleep mode to enable communication with the at least one mobile device.

8. The method of claim 1 wherein said selecting comprises:
determining whether a selection of nodes to perform collection point services satisfies a data collection constraint.

9. The method of claim 1 further comprising:
prioritizing measurement data for routing to nodes performing collection point services.

10. The method of claim 1 further comprising:
prioritizing measurement data for communication to the at least one mobile device.

11. The method of claim 10 wherein said prioritizing occurs according to a type of measurement data.

12. The method of claim 10 wherein said prioritizing occurs according to a probability of future access of a node that generated said measurement data.

13. The method of claim 1 further comprising:
deleting measurement data from a memory of each node of the plurality of nodes of said sensor net when memory capacity of said node is reached.

14. The method of claim 13 further comprising:
processing selected measurement samples stored in said memory of each node to generate derivative measurement data; and
storing said derivative measurement data in said memory of each node, wherein said selected measurement samples are the measurement data selected for said deleting.

15. A sensor device for operating a sensor net, the sensor device comprising:
means for detecting and recording attempts to access measurement data by mobile devices;
means for calculating a probability of future access by a mobile device to said sensor device using said recorded access attempts;
means for receiving information related to probabilities of future access to other sensor devices within said sensor net;
means for communicating information related to the calculated probability of future access of said sensor device to said other sensor devices; and
means for selecting at least one of said sensor device and said other sensor devices to serve as a collection point based on the calculated probability of future access of said sensor device and the probabilities of future access of said other sensor devices.

16. The sensor device of claim 15 further comprising:
means for receiving a wake-up signal from a mobile device to cause said sensor device to exit a low power mode of operation.

17. The sensor device of claim 15 further comprising:
means for communicating the measurement data to the collection point.

18. The sensor device of claim 17 wherein said means for communicating measurement data prioritizes the measurement data for communication.

19. The sensor device of claim 18 wherein the measurement data is prioritized according to a sensor device that originated the measurement data.

20. The sensor device of claim 18 wherein the measurement data is prioritized according to a time of generation of the measurement data.

21. The sensor device of claim 18 further comprising:
means for processing measurement samples.

22. The sensor device of claim 18 further comprising:
means for deleting measurement data from memory of said sensor device.

23. The sensor device of claim 22 wherein said means for deleting prioritizes data for deletion.

24. The sensor device of claim 22 wherein said means for deleting deletes measurement samples before deleting measurement data derived from said deleted measurement samples.

25. The sensor device of claim 24 wherein said derived measurement data is calculated statistically from said deleted measurement samples.

26. A method of operating a sensor device within a sensor net, comprising:
detecting and recording access attempts to said sensor device by one or more mobile devices;
calculating a probability of future access to said sensor device using said recorded access attempts;
communicating probabilities of future access to and from other sensor devices; and
negotiating with said other sensor devices to select at least one sensor device to perform collection point services using said probabilities of future access.

27. The method of claim 26 further comprising:
managing measurement data stored in memory of said sensor device.

28. The method of claim 27 wherein said managing measurement data comprises:
selecting measurement data to be routed to the at least one sensor device performing collection point services according to a prioritization algorithm.

29. The method of claim 28 wherein said managing measurement data further comprises:
selecting measurement data for deletion from said memory to free memory resources.

30. The method .of claim 26 further comprising:
processing measurement samples to generate processed measurement data.

31. The method of claim 26 further comprising:
receiving a wake-up signal from a mobile device; and
exiting a low power mode of operation to communicate with said mobile device in response to the received wake-up signal.

* * * * *